March 23, 1937.   A. SA COUTO   2,074,620
AUXILIARY TOP FOR AUTOMOBILES
Filed Oct. 29, 1935   2 Sheets-Sheet 1
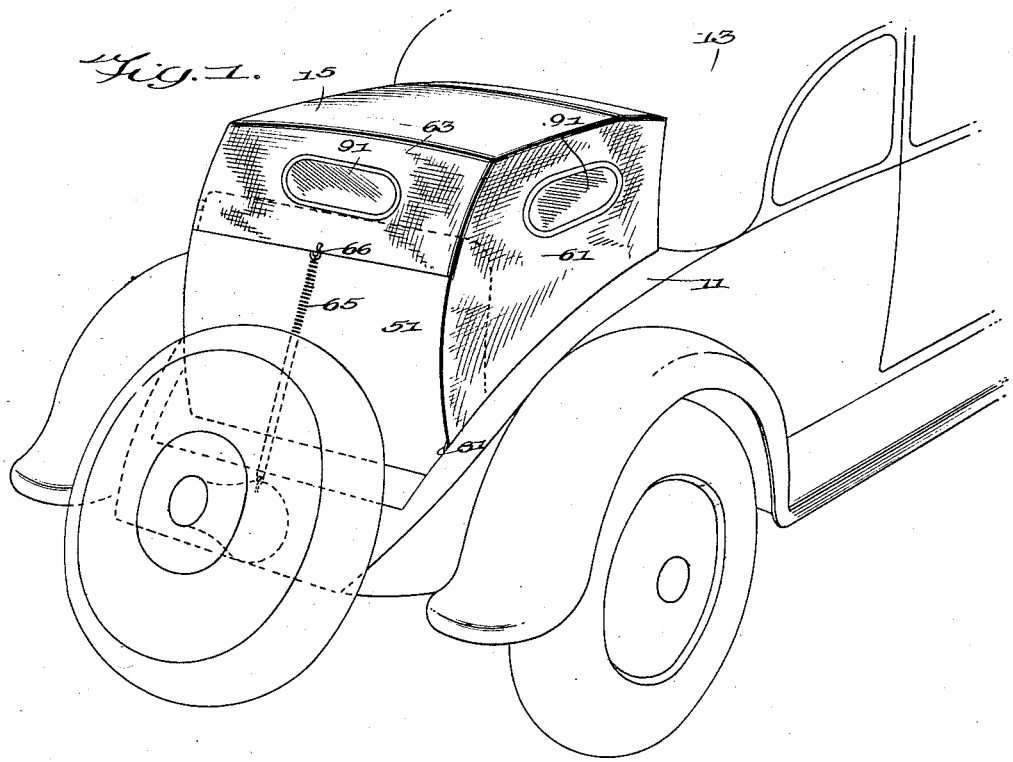
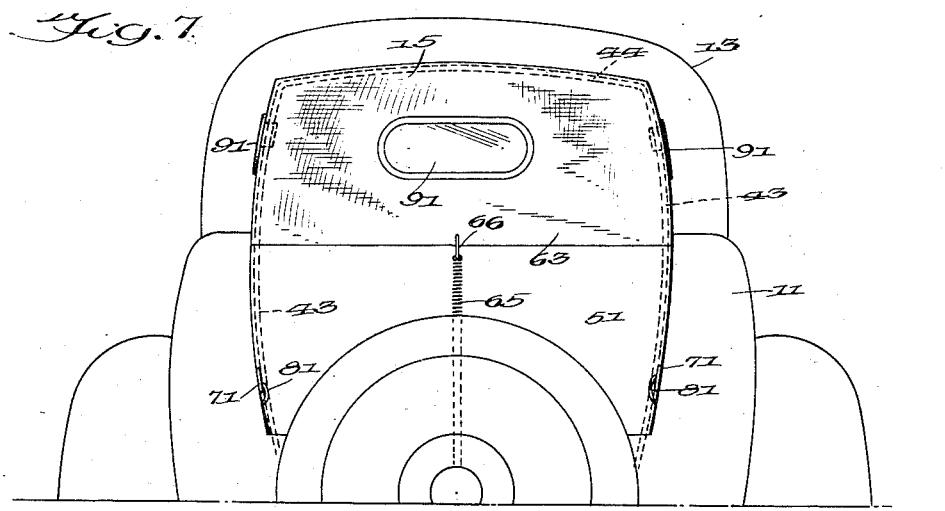
Inventor
Antonio Sa Couto,
By Eugene E. Stevens
Attorney March 23, 1937.  A. SA COUTO  2,074,620
AUXILIARY TOP FOR AUTOMOBILES
Filed Oct. 29, 1935  2 Sheets-Sheet 2
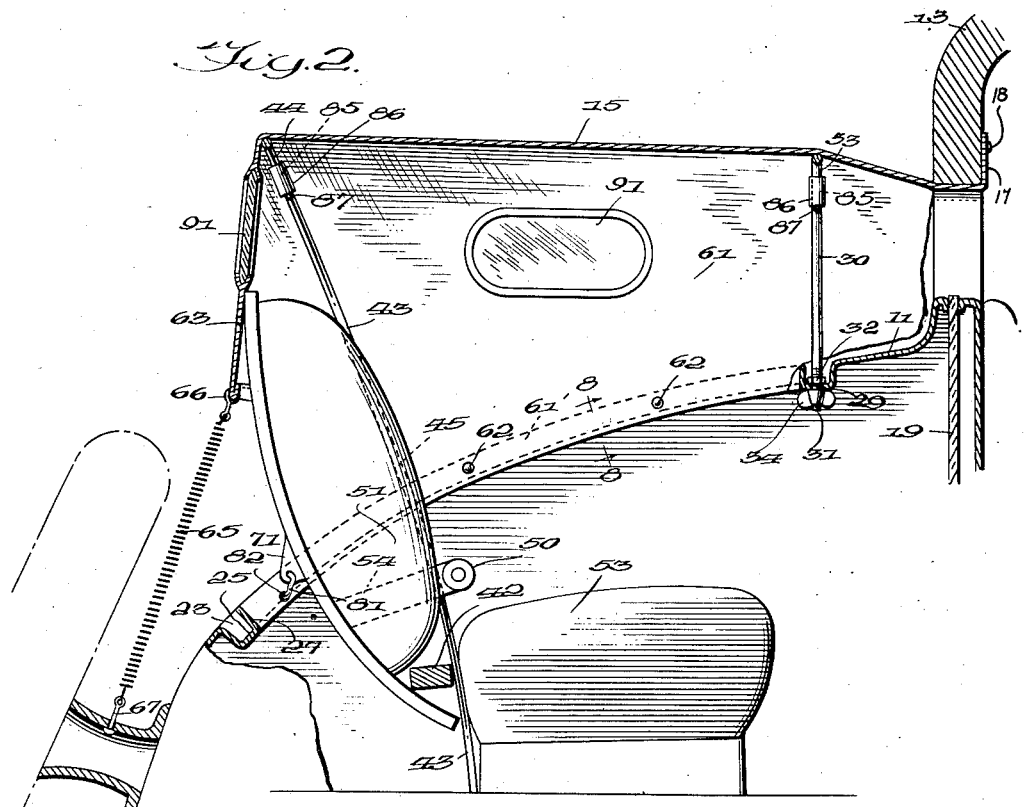
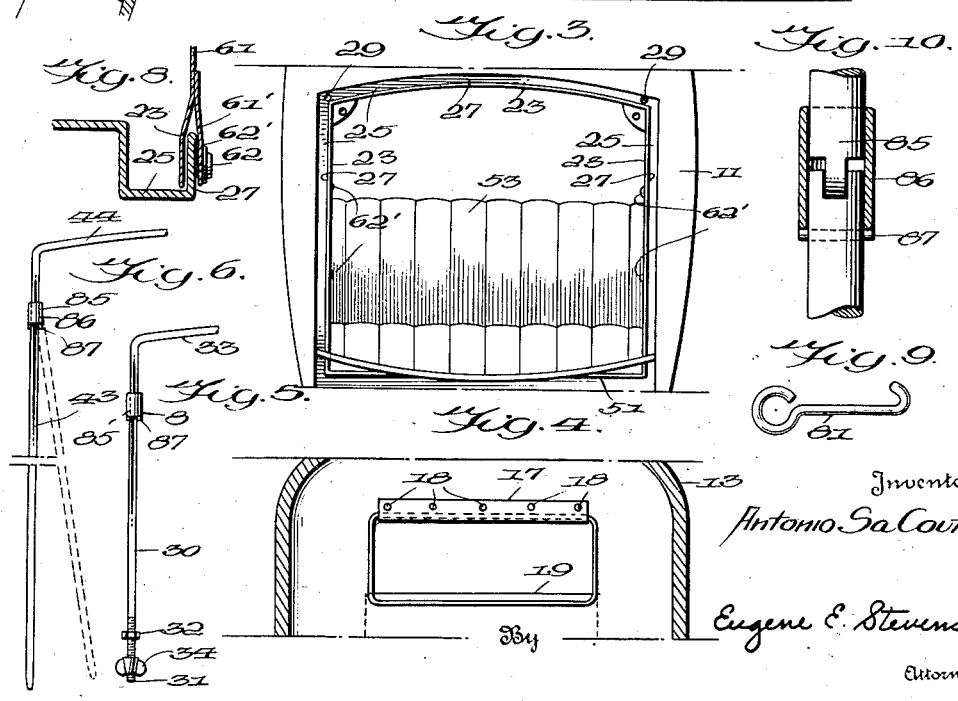
Inventor
Antonio Sa Couto,
By Eugene E. Stevens
Attorney Patented Mar. 23, 1937

2,074,620

UNITED STATES PATENT OFFICE 2,074,620

AUXILIARY TOP FOR AUTOMOBILES

Antonio Sa Couto, Fall River, Mass., assignor of one-half to Joseph F. Souza

Application October 29, 1935, Serial No. 47,322

4 Claims. (Cl. 296—99)

My invention relates to auxiliary automobile tops and has particular reference to tops for rumble seats.

An object of my invention is to provide such a top of an improved construction and which will be adaptable to the rumble seat of any standard make of automobile.

A further object is to provide a top which will require no unsightly alterations of any standard automobile to adopt the automobile to the top.

A further object is to provide a top such as described next above in which the necessary alterations to the automobile can be made by an unskilled person using simple and common tools.

A further object is to provide such a top which can be quickly applied to an automobile, which can be quickly removed, and one which can be folded away into a compact bundle after its removal.

A further object is to provide such a top which is simple in structure; which can be cheaply constructed; and which is strong and sturdy in use.

Other objects and advantages reside in the particular structure of the top, combination and arrangement of the various parts and in other features of the device,—all of which will be readily apparent to those skilled in the art upon reference to the detailed description to follow in conjunction with the drawings which form a part of this specification.

In the drawings:

Figure 1 is a perspective view of the rear portion of an automobile showing the top in position.

Figure 2 is a longitudinal vertical section through the rumble seat and rear portion of an automobile equipped with the top.

Figure 3 is a plan view of a rumble seat with the top removed.

Figure 4 is a detail of the interior of the car body looking to the rear.

Figure 5 is an elevation of a portion of the front top supporting bow.

Figure 6 is an elevation of a portion of the rear top supporting bow.

Figure 7 is a rear view of the automobile and rumble seat top.

Figure 8 is a section on the line 8—8 of Fig. 2.

Figure 9 is an elevation of one of the hooks which connect the top to the automobile body, and Figure 10 is a detail partly in section of one of the top supporting bows.

With particular reference to the drawings, wherein like reference characters designate like parts throughout the several views, 11 indicates the rear deck of a coupe, 13 the usual top thereof, and 15 the rumble seat top. The rear window 19 of the top 13 is shown in a lowered position to permit the extension therethrough of a flap-like portion 17 of the rumble seat top 15. The free edge of the flap 17 is removably attached to that portion of the rear wall of the coupe top 13 which is above the opening of the window 19. This attachment is accomplished by any suitable fasteners 18.

The rear deck 11 has a generally rectangular (in plan) rumble seat opening formed therein the edges of which are provided with the usual drainage grooves 23 which have a floor 25 and an upstanding flange 27. Holes 29 are formed in the floor 25 of the groove 23 which is located on the forward edge of the rumble seat opening. These holes 29 are adapted to receive the threaded ends 31 of the legs 30 of a substantially U-shaped top supporting bow 33 (Fig. 5). Nuts or other stops 32 are provided adjacent the ends 31 to limit the insertion of the same through the openings 29. The bow 33 is maintained in an upright position by clamping the floor 25 between the stops 32 and the wing nuts 34.

The rear top supporting bow 44 (Fig. 6) is also substantially U-shaped and has legs 43 which are substantially longer than the legs 30 of the bow 33. The bow 44 is maintained in a substantially upright position by inserting the ends of the legs 43 thereof behind the usual laterally extending hinges 50 of the rumble seat back 51, in front of the usual inwardly and laterally directed rumble seat stops 42 and behind the rumble seat cushion 53 until the ends of the legs rest on the floor of the car. The legs 43 are inserted between the arms 54 of the hinges 50 and the side edges of the rumble seat opening to prevent lateral movement of the bow 44. Rearward and forward swinging of the bow is prevented by the hinges, stops and cushion just mentioned. Since the lower edge of rumble seat back 51 also serves to confine legs 43 against seat 53 as shown in Fig. 2, the stops 42 can be dispensed with.

It is apparent from the foregoing that the two bows 33 and 44 are rigidly supported in an upright position, yet the only change made in the car is the boring of the two holes 29. As these are in the floor of the groove 23, the appearance of the car is in no wise altered when the top 15 is removed and the rumble seat closed. The bows 33 and 44 are preferably formed of malleable iron or the like. This is especially true with respect to the rear bow 44, as the slight variances among the rumble seats of the various standard cars may require that the legs 43 be bent slightly, as at 45, to allow the top 15 to be positioned thereon in a way to present the best appearance and to provide the most efficient service.

The top 15 is generally rectangular in plan and is provided with the forwardly extending flap 17 already described, depending side flaps 61, and a rear flap 63. Preferably the rear flap 63 is as wide as the widest standard rumble seat and long enough to overlie the top edge of the back of the lowest rumble seat. Preferably, also, the meeting edges of the flaps 61 and 63 are permanently joined together but it is within my contemplation to provide an adjustable connection between these edges to permit a tighter fit over a wide variety of rumble seat backs.

A tension is maintained on top 15 by the resilient member 65 one end of which is connected to the rear flap 63 and to the car body by connections 66 and 67. The members 65, 66, and 67 may be of any suitable form.

The lower edges of the side flaps 61 are curved to conform to the curve of the deck 11 and are provided on the inside with additional flaps 61', which in turn are provided with suitable fasteners 62 for engagement with complementary fasteners 62' which are permanently positioned on the upstanding flange 27 of the side drainage grooves. In the structure shown, the edge of the flap 61 will overlie the flange 27 (see Fig. 8) and will effectually prevent the entrance of rain or the like. The lower rear corners 71 of the flaps 61 are attached to the flange 27 by hooks 81 or other suitable means. The hooks 81 may or may not be permanently secured to the flaps 61 and seat in holes 82 formed in the flange 27.

It is to be noted that the roof of the top extends forwardly of the front bows 33 and merges into the flap 17 adjacent the back of the driver's compartment. It is to be noted, also, that the side flaps 61 are similarly extended and that the free edges thereof are curved to conform to the profile of the automobile in order that a relatively close fit therebetween can be obtained to prevent wind from getting under the top and into the rumble seat. What wind will get between the junction of the top and the driver's compartment, and through the open rear window of the compartment, will not have sufficient force to do damage as it is well known that eddies are formed in the air stream by the curves of the car body and that it is only the top of the compartment itself that is likely to be streamlined sufficiently perfect to permit an unbroken stream of air to slip down the rear wall thereof. This stream can do no damage because by fastening the flap inwardly of the compartment the air cannot get under the top at all but instead is deflected outwardly and downwardly by the forward extensions of the side flaps 61.

I contemplate making my flap 17 wide enough to accommodate the widest standard rear window as the flap edges can be folded to accommodate it to smaller windows.

My arrangement, thus, does away with a front wall for the rumble seat top without exposing the occupants of the seat to inclement weather. Also, this arrangement permits direct communication between the occupants of the rumble seat and the driver.

To facilitate stowing of the top when it is not in use, I have provided joints 85 in the legs 30 and 43 of the top supporting bows 33 and 44 respectively. Said joints are of a known type such as is seen in Figure 10 and are rendered inoperative by straightening them and slipping the collars 86 thereover. Stops 87, below the joints, serve to properly seat the collars around the joints and to prevent the collars from slipping past the joints. When the operator desires to collapse the bows, the collars 86 are slipped upwardly above the joints and the lower ends of the legs are folded inwardly as indicated in broken lines in Fig. 6.

Windows 91 of glass or the like material are formed in the flaps 61 and 63 to permit the occupants of the rumble seat to see. When the rumble seat top is merely used for a sun shade, the side flaps may be unfastened, thrown up onto the roof portion and there fastened together by any suitable means.

In operation, assuming the rumble seat to be open, the front and rear bows 33 and 44 are first placed in position and the wing nuts of the former are tightened. Then the top 15 is thrown over the bows and the front flap 17 is attached to the fasteners 18. The lower edges 61' of the side flaps 61 are then fastened to the flange 27 as described above. Lastly, the top is tensioned by connecting up the tensioning members 65, 66 and 67.

While I have shown the top as applied to the rumble seat of a coupe, it is equally applicable to the rumble seat of a roadster although the position of the fasteners 18 might have to vary in dependence upon the manner in which the rear of the particular top is formed. In this connection it is to be understood that the length of the flap 17 is sufficient to permit its extension into the interior of any standard car but that the position of the fasteners 18 might vary with each type of car to insure a proper fit.

While I have shown and described what is now believed to be the preferred form of my invention, yet it is to be understood that it is susceptible of other forms and variations within the scope of the invention as claimed.

Having thus described my invention, I claim:

1. In a vehicle body having a cab and a rear deck providing a rumble seat pit, a seat in said pit, a closure for said pit and providing a backrest for said seat, pivot means at the sides of said pit for swingably supporting said closure; the combination of a removable top for said rumble seat, and supporting means for said top including rods having a length sufficient to permit their being inserted downwardly into each side of said pit rearwardly of said pivot means and seat, and the lower edge of said closure when in backrest defining position providing a sustaining support for said rods whereby to hold them adjacent said seat.

2. In a vehicle body having a cab and a rear deck providing a rumble seat pit, a seat in said pit, a closure for said pit and when open providing a backrest for said seat, and pivot means at the sides of said pit swingably supporting said closure; the combination of a removable top for said rumble seat, supporting means for said top including rods having a length sufficient to permit their being inserted downwardly into each side of said pit rearwardly of said pivot means and seat, the lower edge of said closure when in backrest defining position providing a sustaining support for said rods whereby to hold them adjacent said seat and pivot means, the fore part of said top being detachably secured to said cab, and yielding means connecting the rear part of the top to the body rearwardly of said pit to tension both said top and said rods.

3. In a vehicle body having a cab providing rear window opening, a rear deck providing a rumble seat pit, a seat in said pit, a swingingly mounted closure for said pit and which closure when open providing a backrest for said rumble seat; the combination of a protective top adapted to be disposed over occupants of said rumble seat, a removable and upstanding rear support for said top, and said support comprising rods having a length sufficient to permit their being inserted downwardly into each side of said pit rearwardly of said seat, and the lower edge of said closure when in backrest defining position engaging lower portions of said rods for sustaining said rear support when the closure is open.

4. In a vehicle body having a cab providing a rear window opening, a rear deck providing a rumble seat pit, a seat in said pit, a swingingly mounted closure for said pit and which closure when open providing a backrest for said rumble seat; the combination of a protective top adapted to be disposed over occupants of said rumble seat, a removable and upstanding rear support for said top, said support comprising rods having a length sufficient to permit their being inserted downwardly into each side of said pit rearwardly of said seat, and the lower edge of said closure when in backrest defining position engaging lower portions of said rods for sustaining said rear support when the closure is open, an upstanding support for said top at the front of said pit, said deck providing a seat for the lower end of said support, and an adjustable stop on said support for varying entry of the latter into said seat whereby the effective height of said front support may be varied to adjustably tension said top.

ANTONIO SA COUTO.